United States Patent [19]

Ono et al.

[11] Patent Number: 5,394,406
[45] Date of Patent: Feb. 28, 1995

[54] DATA COMMUNICATION APPARATUS

[75] Inventors: Takashi Ono, Yokosuka; Yasuhide Ueno, Fuchu, both of Japan

[73] Assignee: Canon Kabushiki Kaisha, Tokyo, Japan

[21] Appl. No.: 882,550

[22] Filed: May 13, 1992

[30] Foreign Application Priority Data

May 14, 1991 [JP] Japan ................. 3-109228

[51] Int. Cl.⁶ ............. G08C 25/02; H04L 1/18
[52] U.S. Cl. ............. 371/32; 358/400; 358/431
[58] Field of Search ............. 371/32, 30, 37.1; 358/400, 431, 406, 427

[56] References Cited

U.S. PATENT DOCUMENTS

| | | | |
|---|---|---|---|
| 4,386,373 | 5/1983 | Kondo | 358/431 |
| 4,500,926 | 2/1985 | Yoshimaru | 358/256 |
| 4,586,088 | 4/1986 | Kondo | 358/257 |
| 4,862,282 | 8/1989 | Nakajima | 358/400 |
| 4,887,162 | 12/1989 | Arai | 358/400 |
| 5,077,742 | 12/1991 | Tsumura et al. | 371/32 |
| 5,159,465 | 10/1992 | Maemura et al. | 358/405 |
| 5,172,246 | 12/1992 | Yoshida | 358/406 |

FOREIGN PATENT DOCUMENTS

| | | |
|---|---|---|
| 0084459 | 7/1983 | European Pat. Off. . |
| 0201772 | 11/1986 | European Pat. Off. ....... H04N 1/00 |
| 0333159 | 9/1989 | European Pat. Off. ....... H04N 1/32 |
| 2635627 | 2/1990 | France . |
| 3128414 | 2/1982 | Germany . |
| 2222740 | 3/1990 | United Kingdom . |

*Primary Examiner*—Robert W. Beausoliel, Jr.
*Assistant Examiner*—Joseph E. Palys
*Attorney, Agent, or Firm*—Fitzpatrick, Cella, Harper & Scinto

[57] ABSTRACT

A data communication apparatus having an error correction communication mode, includes a memory for storing data to be transmitted in the error correction communication mode, and a control unit for, when a data amount to be transmitted in the error correction communication mode cannot be stored in the memory, transmitting dummy data in addition to data stored in the memory so as to assure the data amount.

46 Claims, 14 Drawing Sheets

| | FRAME NO. |
|---|---|
| IMAGE DATA | 0 |
| IMAGE DATA | 1 |
| IMAGE DATA | 2 |
| ⋮ | ⋮ |
| IMAGE DATA | 62 |
| IMAGE DATA / FILL | 63 |
| FILL | 64 |
| FILL | 65 |
| FILL | 66 |
| ⋮ | ⋮ |
| FILL | 254 |
| FILL | 255 |

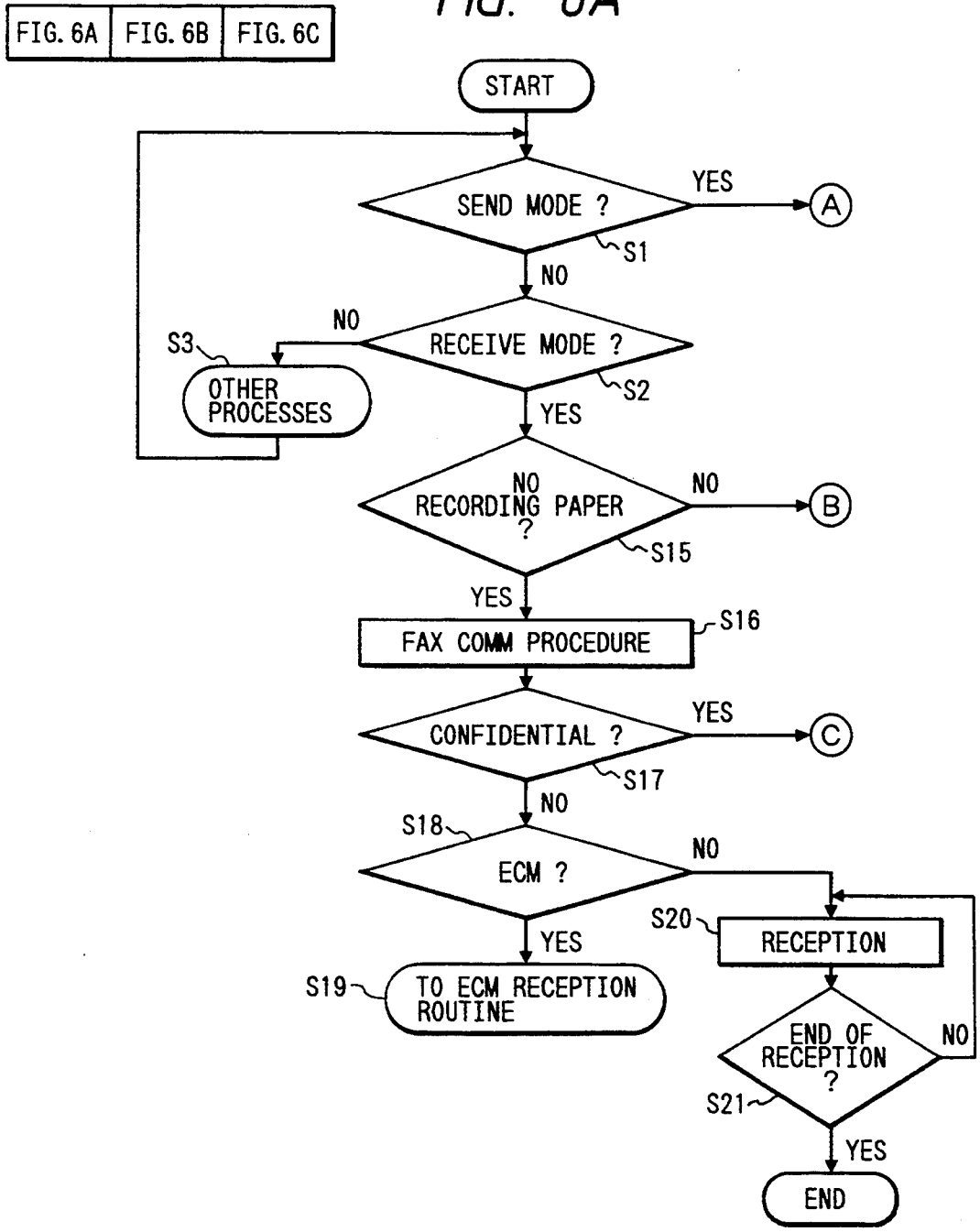

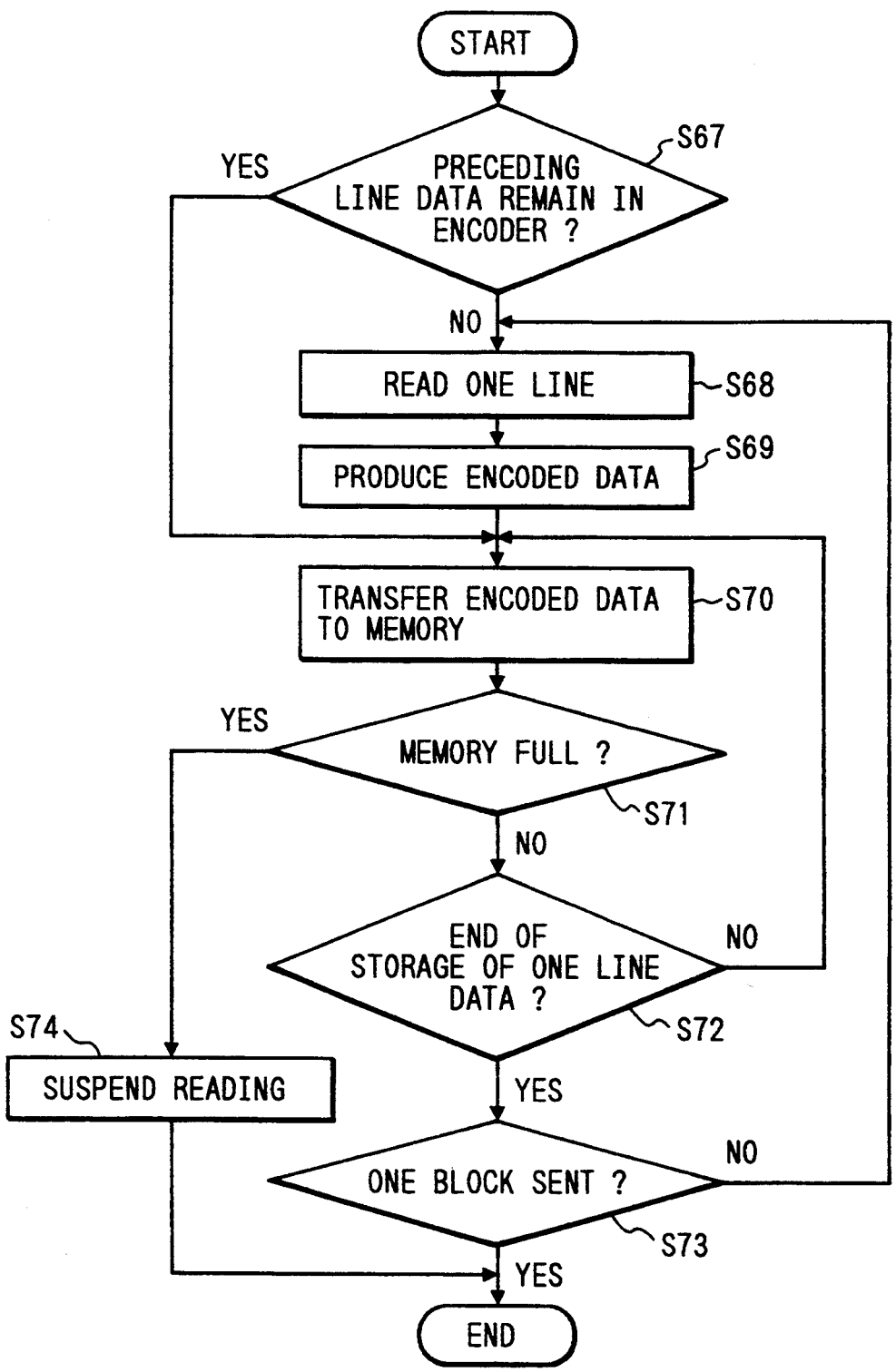

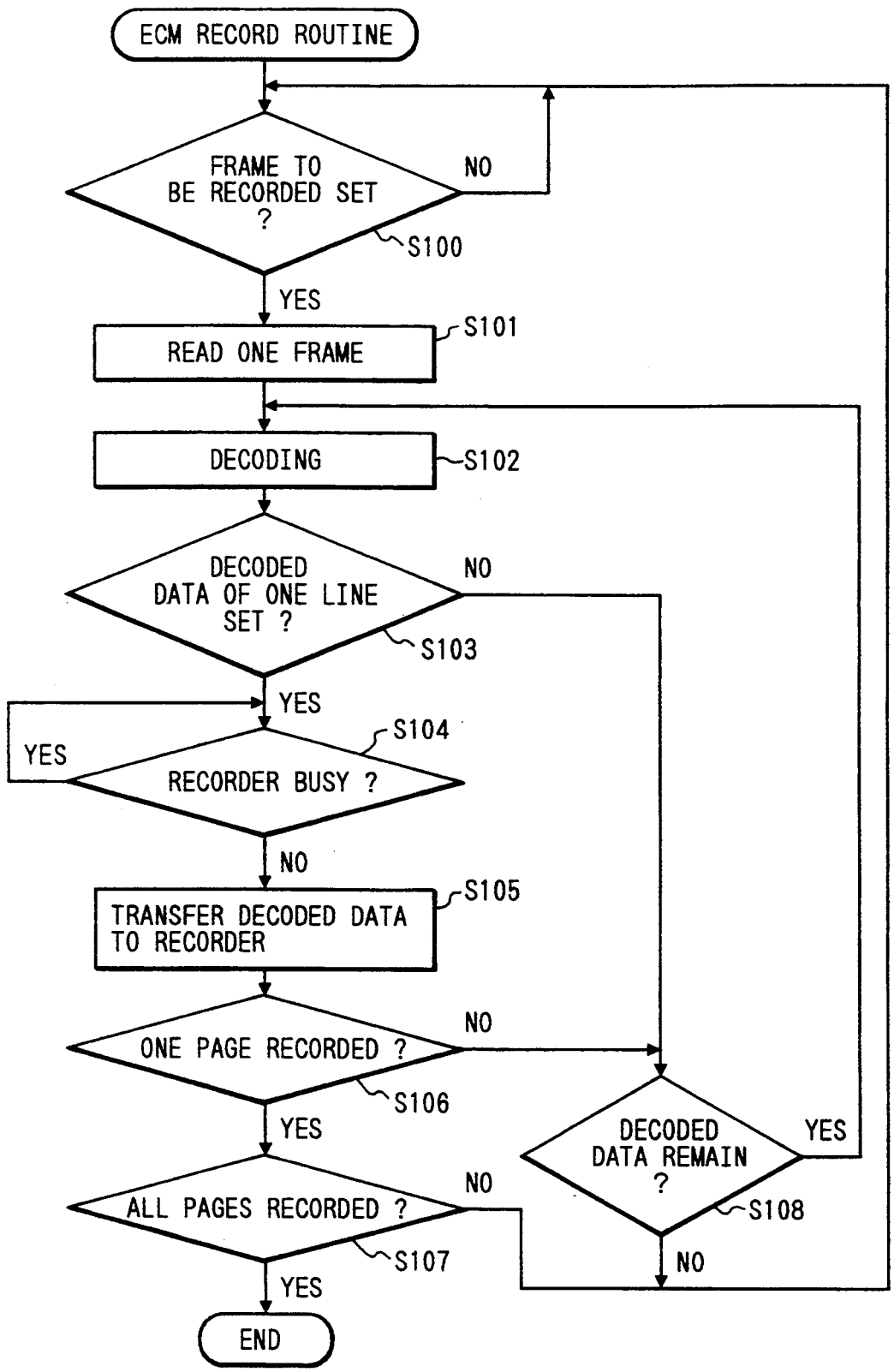

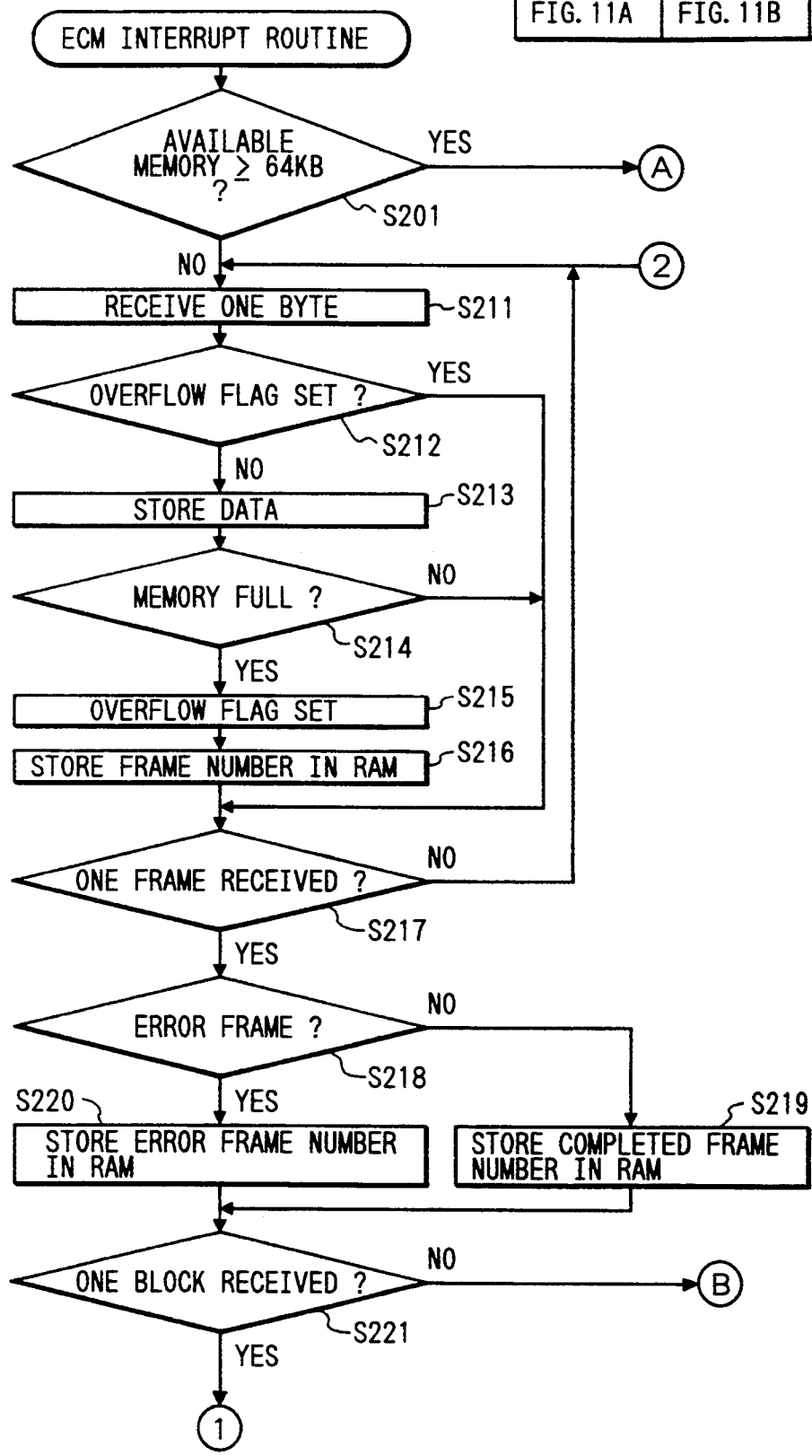

DATA COMMUNICATION APPARATUS

BACKGROUND OF THE INVENTION

1. Field of the Invention

The present invention relates to a data communication apparatus having an error correction communication function.

2. Related Background Art

As a conventional error correction mode, an error correction communication based on a full-duplex communication and an error correction communication based on a half-duplex communication are known. In particular, in the error correction communication based on the half-duplex communication, since a data (image signal) communication sequence and an error correction sequence are sequentially executed, a memory having a predetermined storage capacity or more for holding data is necessary. For example, in an error correction mode (ECM) standardized by the CCITT, a memory having a storage capacity of 64 kbytes must be equipped.

In the above-mentioned error correction communication, in particular, in the error correction communication based on the half-duplex communication, a memory having a predetermined storage capacity or more must be equipped. For example, when a communication in the ECM is to be performed, a memory capacity of 64 kbytes or more must be assured.

A data communication apparatus having a data storage memory normally performs memory transmission or memory reception of data. At this time, when a 64-kbyte ECM memory is left unused, the memory cannot be efficiently utilized as a whole.

However, when the unused memory capacity is smaller than 64 kbytes, a communication in the ECM cannot be performed.

As patents associated with an error re-transmission or re-send operation, U.S. Pat. Nos. 4,829,524 and 4,885,755 are known.

As applications associated with the ECM, U.S. application Ser. Nos. 267,541 (application date: Nov. 4, 1988) and 337,152 (application date: Apr. 12, 1989) are known.

As an application which can solve the above-mentioned problem, and is associated with reception, U.S. application Ser. No. 670,934 (application date: Mar. 18, 1991) is known. However, the present application is associated with transmission, which can solve the above-mentioned problem.

SUMMARY OF THE INVENTION

The present invention has been made in consideration of the above situation, and has as its object to provide a data communication apparatus and a data communication method, which allow an error correction communications using a small memory capacity.

It is another object of the present invention to provide a method and apparatus, wherein when a data communication is performed in units of predetermined amounts, and a data amount is smaller than the predetermined amount, dummy data is generated to assure the predetermined amount.

Other objects of the present invention will be apparent from the following detailed description of the embodiments in conjunction with the accompanying drawings.

BRIEF DESCRIPTION OF THE DRAWINGS

FIGS. 6a–c together comprise a flow chart showing a control operation of a CPU 8;

FIG. 9 is a data storage sequence;

FIG. 10 is a flow chart showing a control operation of the CPU 8 of this embodiment;

FIGS. 11a–c together comprise a flow chart showing a control operation of the CPU 8 of this embodiment.

DETAILED DESCRIPTION OF THE PREFERRED EMBODIMENTS

[First Embodiment]

The first embodiment of the present invention will be described in detail below with reference to the accompanying drawings.

In the first embodiment to be described below, a facsimile apparatus for performing an image data communication in the ECM will be exemplified. However, the present invention is not limited to the ECM, and not limited to the facsimile apparatus. The present invention can be applied to various other data communication apparatuses which perform error correction communications (e.g., TELETEX, computer communications, and wordprocessor communications).

Figure 1:
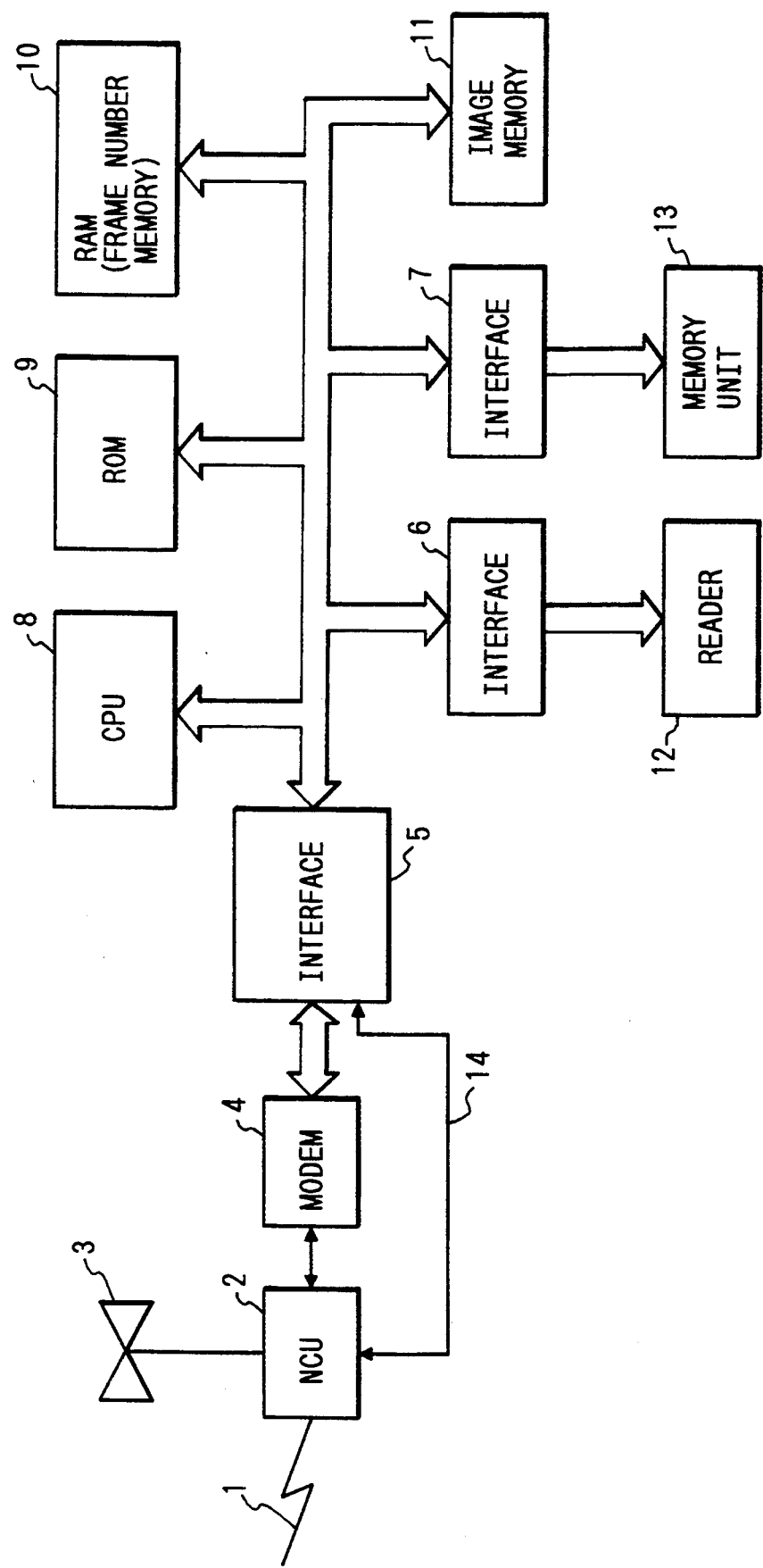
FIG. 1 is a block diagram showing a facsimile apparatus according to an embodiment of the present invention.

FIG. 1 is a block diagram showing a schematic arrangement of a facsimile apparatus having an ECM function.

In FIG. 1, a communication line 1 is connected to a telephone set 3 through an NCU (network control unit) 2.

The NCU 2 switches the communication line 1 between the telephone set 3 and a modem 4.

The modem 4 modulates/demodulates an image signal and a control signal of a facsimile communication procedure, and has a modulation/demodulation function based on the CCITT recommendation V21, V27ter, V29, or the like.

An interface 5 interchanges signals between the modem 4 and a CPU 8.

An interface 6 interchanges signals between a reader 12 and the CPU 8, and an interface 7 interchanges signals between a memory unit (or recorder) 13 and the CPU 8.

The CPU 8 controls the overall facsimile apparatus of this embodiment, and comprises a microcomputer. The CPU 8 executes a control program stored in a ROM (read-only memory) 9 to control the apparatus. The CPU 8 executes coding/decoding processing of image data.

A RAM (random access memory) 10 temporarily stores various kinds of information. The RAM 10 is allocated with a frame number storage area for storing a frame number of an error frame in the ECM or a memory overflow frame.

An image memory 11 stores image data, and is used in memory transmission and reception modes and the ECM.

The reader 12 reads an original.

The recorder (printer) 13 records image data.

The arrangement of the facsimile apparatus has been described. Transmission and reception operations of the facsimile apparatus of this embodiment will be briefly described below.

The transmission operation will be described first. When a memory transmission mode is designated by a key input switch (not shown) arranged on the reader 12, the reader 12 reads an original, codes read image data, and stores the coded image data in the image memory. Upon completion of reading of all the originals, a dialing (call generation) operation is performed for a destination station designated by dial keys arranged on the reader 12. When a line is connected to the destination station, a facsimile communication procedure is executed to exchange a control signal with the destination station, thus setting a communication mode. In the facsimile communication procedure, when the destination station has an ECM function, an image communication in the ECM is performed. When the destination station does not have an ECM function, a normal image communication is performed.

When a real-time transmission mode is designated, the call generation operation is performed for a destination station, and the facsimile communication procedure is executed to set a communication mode. Thereafter, original images are sequentially read and transmitted.

The reception operation will be described below. When no paper sheet is set in the recorder 13 or a confidential mode is designated by a station on the other end of the line, a memory reception operation for storing a received image in the image memory is performed. When paper sheets are set in the recorder 13 and no confidential mode is designated, a normal reception/recording operation is performed.

In the facsimile communication procedure, when a station on the other end of the line has an ECM function, an image communication in the ECM is performed. When the station on the other end of the line does not have an ECM function, a normal image communication is performed.

In the facsimile apparatus of this embodiment, the image memory 11 is used in the memory transmission and reception modes, and is also used as a buffer memory in the ECM. In the ECM of the CCITT recommendation, a buffer memory of at least 64 kbytes for storing image data for one block (one partial page) is required. However, in this embodiment, since the image memory 11 is effectively utilized in the memory transmission and reception modes, one of the following two operations is executed according to a use condition of the image memory. In one operation, when the image memory has a free capacity of 64 kbytes or more, a normal ECM image communication using the 64-kbyte memory is performed. In the other operation, when the memory does not have a 64-kbyte free capacity, a reading operation is suspended, "Fill" data (transfer of "0"s) is filled after data of the last line, which can be stored in the memory, up to the end of a corresponding block, and this block is transmitted as a Null block. Data after a line sync code of the next line are transmitted in the next block.

Figure 2:
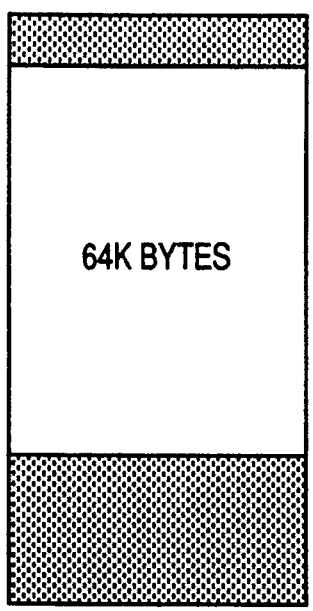
FIG. 2 is a view showing a free capacity of an image memory.
Figure 3:
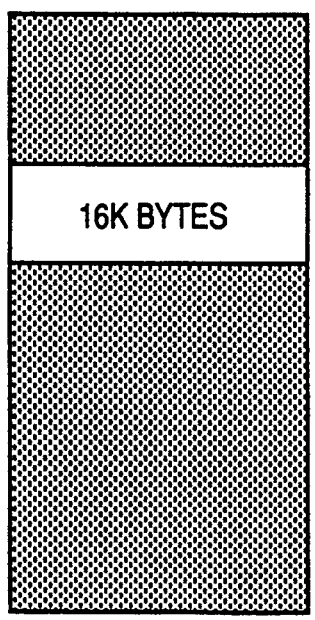
FIG. 3 is a view showing a free capacity of the image memory.
Figures 4, 5:
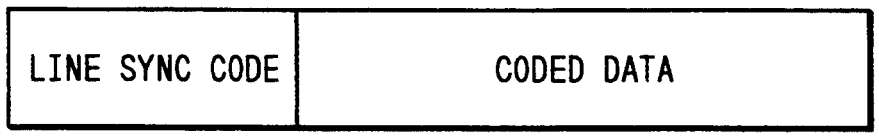
FIG. 4 is a view showing image data in one block.
FIG. 5 is a view showing data in the first frame of a block next to a Null block.

FIGS. 2 and 3 show the image memory. In FIGS. 2 and 3, a blank portion corresponds to a free area, and a hatched portion corresponds to an area in use. When an ECM transmission operation is performed, if a 64-kbyte memory space is free, as shown in FIG. 2, a normal ECM communication is performed. In contrast to this, for example, assume that a 16-kbyte memory space remains, as shown in FIG. 3. In this case, 62 frames (1 frame =256 bytes) of image data can be stored. If image data for one image of an image to be stored cannot be stored in 62 frames, a reading operation is suspended when the image data are no longer stored, and "Fill" data are transmitted in the remaining 194 frames from the end of image data in the last line, which can be stored, as shown in FIG. 4. Data after a line sync code of a line next to the line, which can be stored, are transmitted in the next block. FIG. 5 shows data in the first frame of a block next to a Null block. In this manner, even when no predetermined memory space for performing an ECM communication remains, the ECM transmission can be realized. Thus, the functions of the apparatus can be fully utilized, and the memory can be effectively utilized.

FIGS. 6 to 11 are flow charts showing the control operations of the CPU 8 of this embodiment. The control program for executing these flow charts is stored in the ROM 9. The operation of this embodiment will be described in detail below with reference to these flow charts.

Figure 6B:
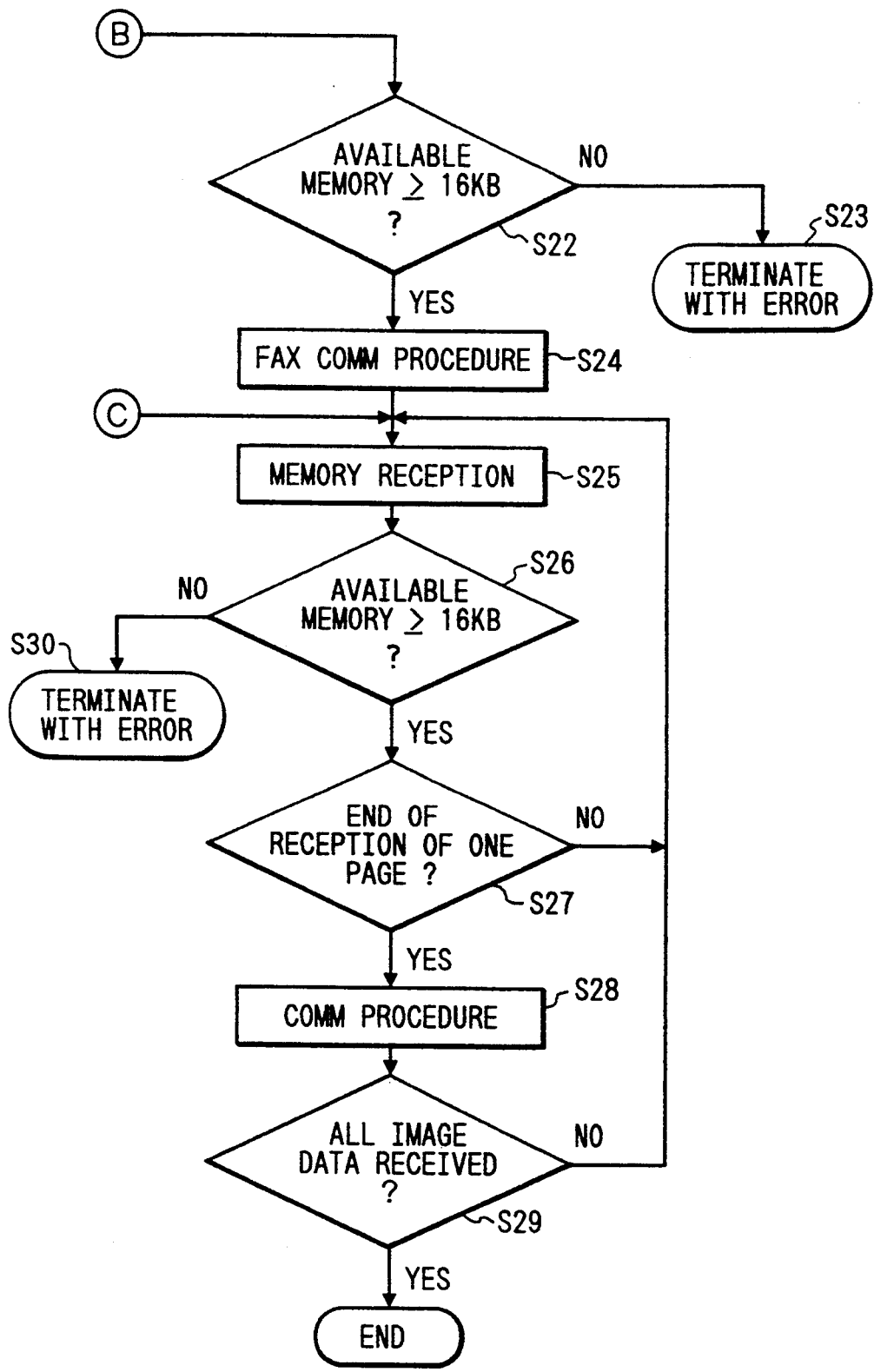
Figure 6C:
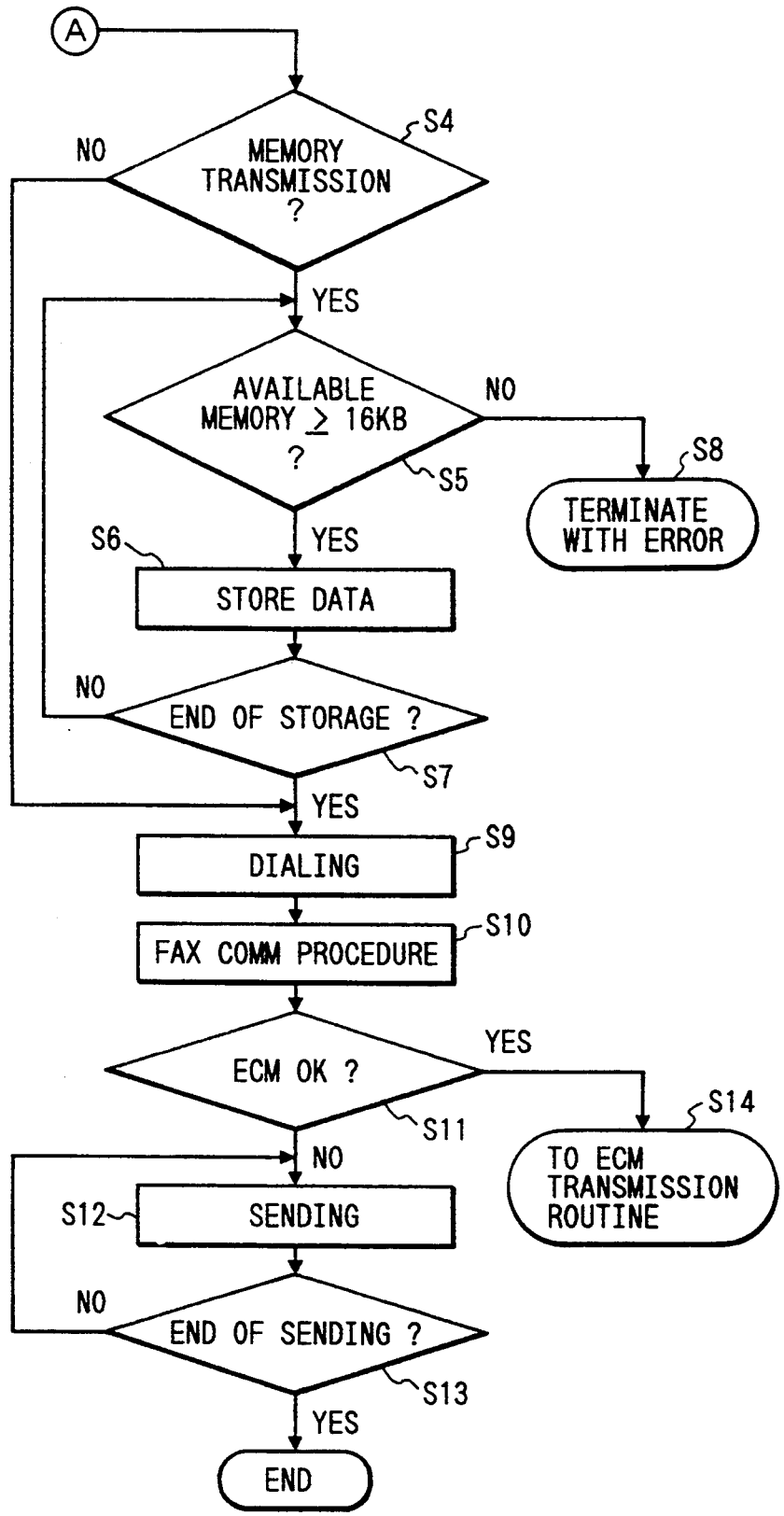

In steps S1 and S2 in FIG. 6, it is detected if a transmission instruction is input from the key input switch on the reader 12 i.e., the send mode is set and if a calling signal from the line 1 is detected (presence/absence of an incoming call) i.e., a receive mode is set. If the transmission instruction is input, the flow advances from step S1 to step S4 to check if the memory transmission mode is selected. If the memory transmission mode is selected, original images are read by the reader 12, the read images are coded, and the coded images are sequentially stored in the image memory 11 in steps S5, S6, and S7. At this time, it is checked in step S5 if the free capacity of the image memory 11 is equal to or larger than 16 kbytes. When the free capacity of the image memory 11 becomes 16 kbytes, the processing is terminated with a "memory full" storage error in step S8. In this manner, image data are stored in the memory 11, and if it is determined in step S7 that all the original images are stored, the flow advances to step S9.

On the other hand, if it is determined in step S4 that the memory transmission mode is not selected, the flow advances from step S4 to step S9. In step S9, a dialing operation is performed to a destination station designated by a dial key (ten keys, a one-touch dial key, or the like) on the reader 12. Note that the NCU 2 has an auto dialer, and the CPU 8 sends dial data to the auto dialer of the NCU 2, thus starting the dialing operation. When the line 1 is connected to the destination station, a facsimile communication procedure is executed in step S10. If it is determined in step S11 in the communication procedure that the destination station is an apparatus having an ECM function, the flow advances to an ECM transmission routine in step S14. On the other hand, if it is determined in step S11 that the destination station does not have an ECM function, sending is performed in step S12. In the memory transmission mode, image data are transmitted from the image memory 11, while in a real-time transmission mode, image data read by the reader 12 are sequentially coded and transmitted. When a function capable of changing a memory capacity used in the ECM communication mode is set as a non-standard function, the same operation as in the normal ECM communication (a 64-kbyte memory capacity to be used) is performed using the set memory capacity (e.g., 16 kbytes). This operation will be described in detail below. A free capacity (e.g., 16 kbytes) of the memory to be able to be currently used in the ECM communication mode is informed from a station on the other end of the line. A station on this end of the line (to be referred to as a "self station" hereinafter) compares the informed capacity with a free capacity (e.g., 20 kbytes) of the memory to be able to be currently used in the ECM communication mode, and selects the smaller free capacity (e.g., 16 kbytes) of the memory. The self station sets to perform the ECM communication mode of the self station using the selected memory capacity (e.g., 16 kbytes), and informs the selected memory capacity (e.g., 16 kbytes) to the station on the other end of the line. In this manner, the ECM communication is performed using a memory capacity (e.g., 16 kbytes) smaller than a memory capacity (64 kbytes) necessary for the normal ECM communication. In order to simplify control for setting a memory capacity, some values to be assumed as a memory capacity to be used may be determined in advance. For example, four memory capacity values (e.g., 16 kbytes, 32 kbytes, 48 kbytes, and 64 kbytes) may be set. In this case, since a memory capacity to be used has only four states, these states can be expressed by 2 bits. Thus, a non-standard function signal in the procedure signal can be simplified. After the memory capacity is set, the normal ECM communication is performed.

In this manner, when all the image data are transmitted, the transmission operation is ended.

If it is determined in step S2 that a calling signal (a calling signal of 16 Hz or a calling signal of 1,300 Hz) is detected, the flow advances to step S15 to check the presence/absence of recording sheets in the recorder 13. If there is no recording sheet in the recorder 13, it is checked in step S22 if the free capacity of the image memory is equal to or larger than 16 kbytes. If the free capacity of the memory 11 is larger than 16 kbytes, the facsimile communication procedure is executed in step S24; if the free capacity of the memory 11 is 16 kbytes, the processing is terminated with a "no recording sheet" error in step S23.

If there are recording sheets in the recorder 13, the flow advances from step S15 to step S16, and the facsimile communication procedure is executed. In steps S17 and S18, it is checked if a confidential mode and the ECM are designated in the facsimile communication procedure. If the confidential mode is designated, the flow advances from step S17 to step S25, and a memory reception operation in the confidential mode is executed. If the ECM is designated, an ECM reception routine in step S19 is executed. If neither the confidential mode nor the ECM are designated, the flow advances from step S18 to step S20, and received image data are sequentially recorded (in a real-time reception/recording mode). Upon completion of reception of all the image data, the control operation is ended. If recording sheets in the recorder 13 are used up during the reception/recording operation in steps S20 and S21, the flow advances to step S26, and the memory reception operation is started.

When there is no recording sheet, the flow advances to steps S15, S22, and S24, as described above, and the memory reception operation is performed in step S25. On the other hand, when the confidential mode is designated, the flow advances from step S17 to step S25, and the memory reception operation is performed. It is checked in step S26 if the remaining capacity (free capacity) of the image memory 11 is larger than 16 kbytes. If the remaining capacity of the memory 11 is 16 kbytes, the processing is terminated with an error in step S30. If the remaining capacity of the memory 11 is larger than 16 kbytes, it is checked in step S27 if image reception for one page is completed. If it is determined in step S27 that the image reception for one page is completed, the facsimile communication procedure is executed in step S28. It is checked in step S29 if reception of all the images is completed. If it is determined in step S29 that the reception of all the images is completed, the reception operation is ended.

As described above, in the flow shown in FIG. 6, the memory is used in the memory reception and transmission modes until the remaining capacity of the image memory 11 becomes 16 kbytes.

The ECM transmission operation of the first embodiment will be described below.

Figure 7:
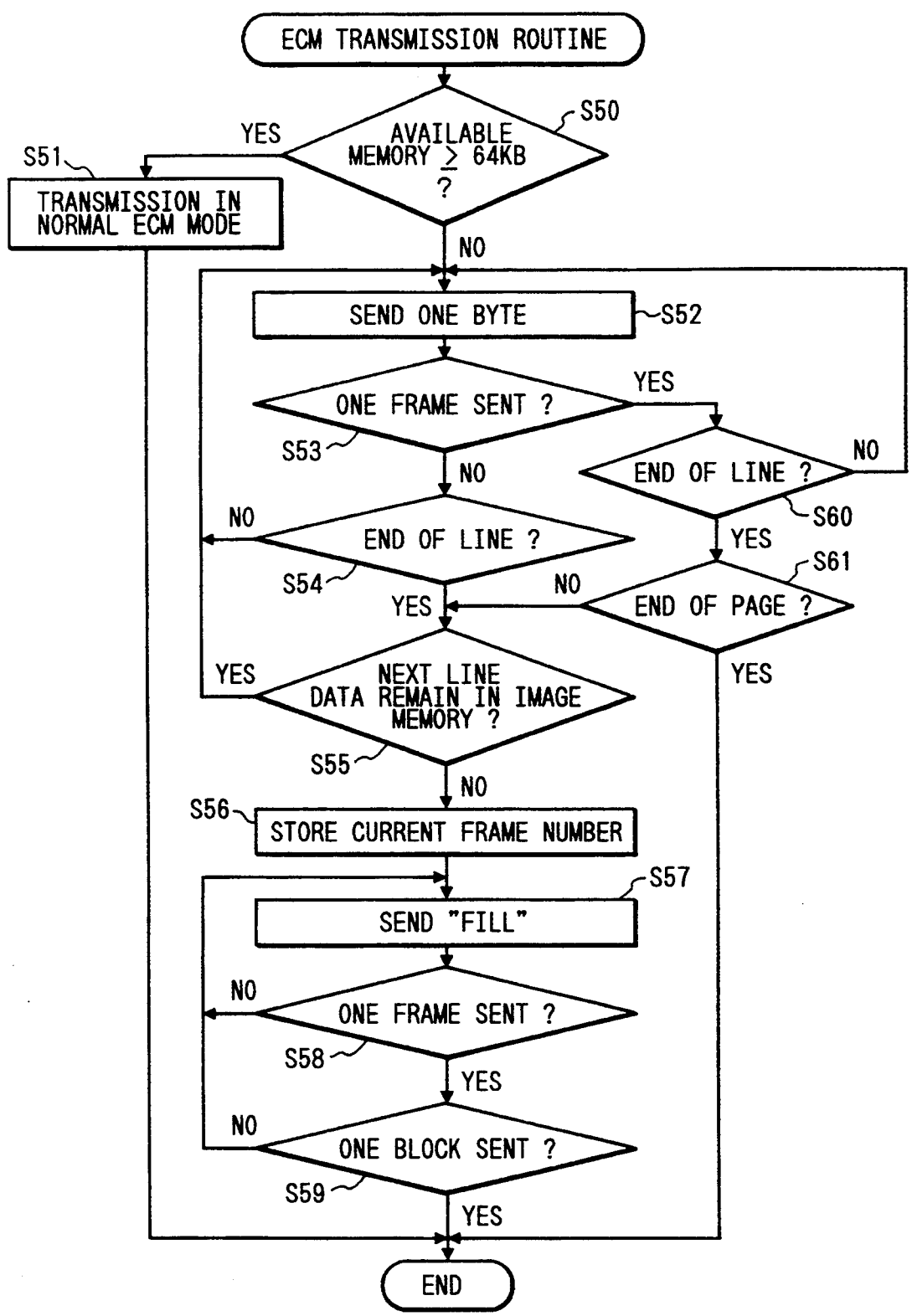
FIG. 7 is a flow chart showing an image data communication.

FIG. 7 shows a 1-block ECM transmission sequence according to the first embodiment. It is checked in step S50 if the available memory capacity is equal to or larger than 64 kbytes. If it is determined in step S50 that the available memory capacity is equal to or larger than 64 kbytes, a normal ECM transmission is performed in step S51. However, if it is determined in step S50 that the available memory capacity is smaller than 64 kbytes, a control unit performs processing for reading out the content of the memory by one byte, and transferring the readout content to a transmission unit in step S52. In step S53, the control unit performs processing for checking if one frame (256 bytes) is sent. If it is determined in step S53 that one frame is not sent yet, the end of line is checked in step S54. If the end of line is detected in step S54, it is checked in step S55 if data for one line to be sent next remain in the memory 11. If the data for the next line remain in the image memory 11, the transmission operation is continued.

On the other hand, if there are not data to be sent in the memory 11, the frame number of a currently transmitting frame or a just transmitted frame when the end of line coincides with the end of frame, is stored in step S56. As for the following frames, "Fill" data are transmitted in steps S57 to S59 until the partial page (block) is ended.

On the other hand, if the end of line is determined in step S60, and furthermore, if the end of page is determined in step S61, since the partial page is ended, processing for one page is ended without transmitting "Fill" data.

In the first embodiment, reading processing is controlled according to the free capacity of the memory. More specifically, the reading processing is continued until the image memory becomes full, and when the image memory is full, an original feeding operation is suspended until the next partial page is transmitted. This sequence is shown in FIG. 9.

Figure 8:
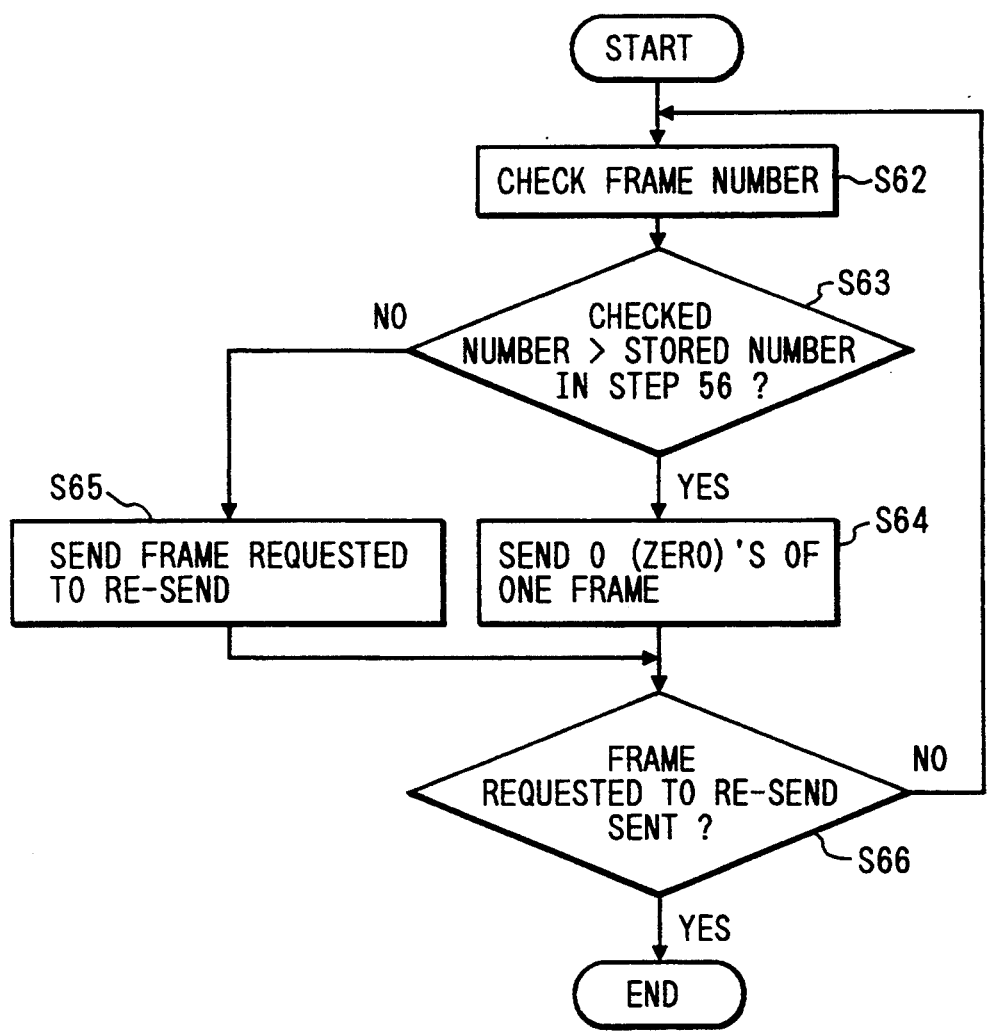
FIG. 8 is a flow chart showing a re-send sequence.

FIG. 8 shows processing upon reception of a re-send request. In step S62, the frame number of a frame to be re-sent in the re-send request is checked.

In step S63, it is checked if the frame number is larger than the frame number stored in step S55, i.e., if the requested frame is a frame including image data or a frame consisting of only "Fill" data. If the requested frame is the frame consisting of only "Fill" data, "0"s are sent for one frame in step S64. On the other hand, if the requested frame is the frame including image data, the requested frame is read out from the memory, and the readout frame is sent in step S65. At this time, if data are smaller than one frame, "0"s are filled in the frame after the data as required, and the frame is sent. In step S66, it is checked if all the frames requested to re-send are sent. The routine shown in FIG. 8 is continued until all the requested frames are sent.

FIG. 9 is a flow chart showing a reading operation when the ECM communication is performed using a memory capacity smaller than a predetermined amount (64 kbytes).

FIG. 9 shows a sequence when image data are stored in the memory. It is checked in step S67 if data of the immediately preceding line remain in a coding unit (CPU 8) without being transferred to the memory. If no data remain, an image for one line is read in step S68. More specifically, original feeding and reading operations are performed to transfer image data to the coding unit (CPU 8). In step S69, coded data are generated based on the read image data.

In step S70, data remaining in the coding unit (CPU 8) or the coded data are transferred to the memory. In step S71, it is checked if the memory is full. If the memory is not full, it is checked in step S71 if all the data for one line are stored. If the storage operation of the data for one line is not completed, the end of one block (partial page) is checked in step S73.

If it is determined in step S71 that the memory is full, the reading operation is suspended in step S74 when the memory is full. The reading operation is restarted when transmission of the next partial page is permitted.

The ECM reception operation of this embodiment will be described below.

Figure 11B:
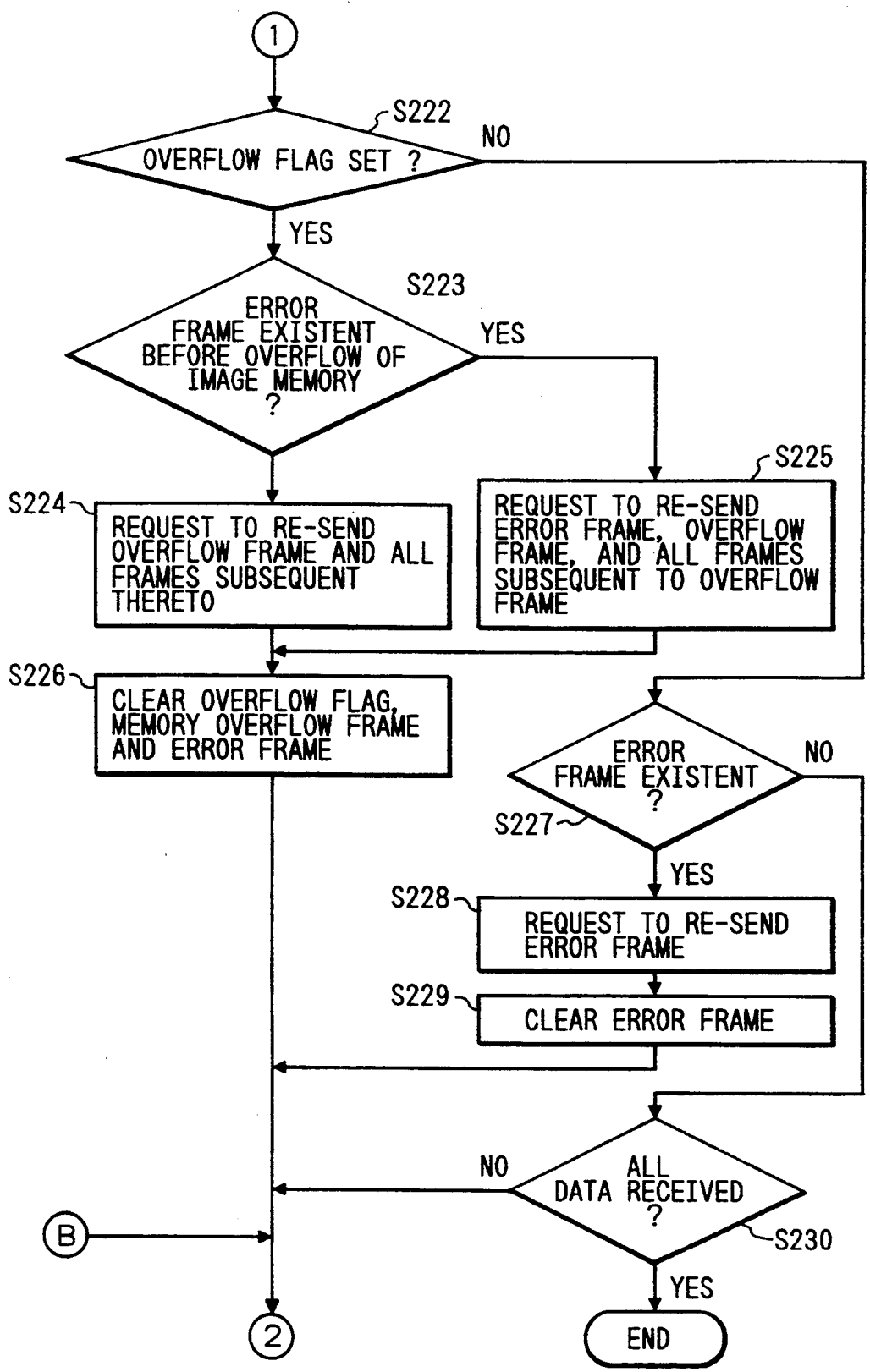
Figure 11C:
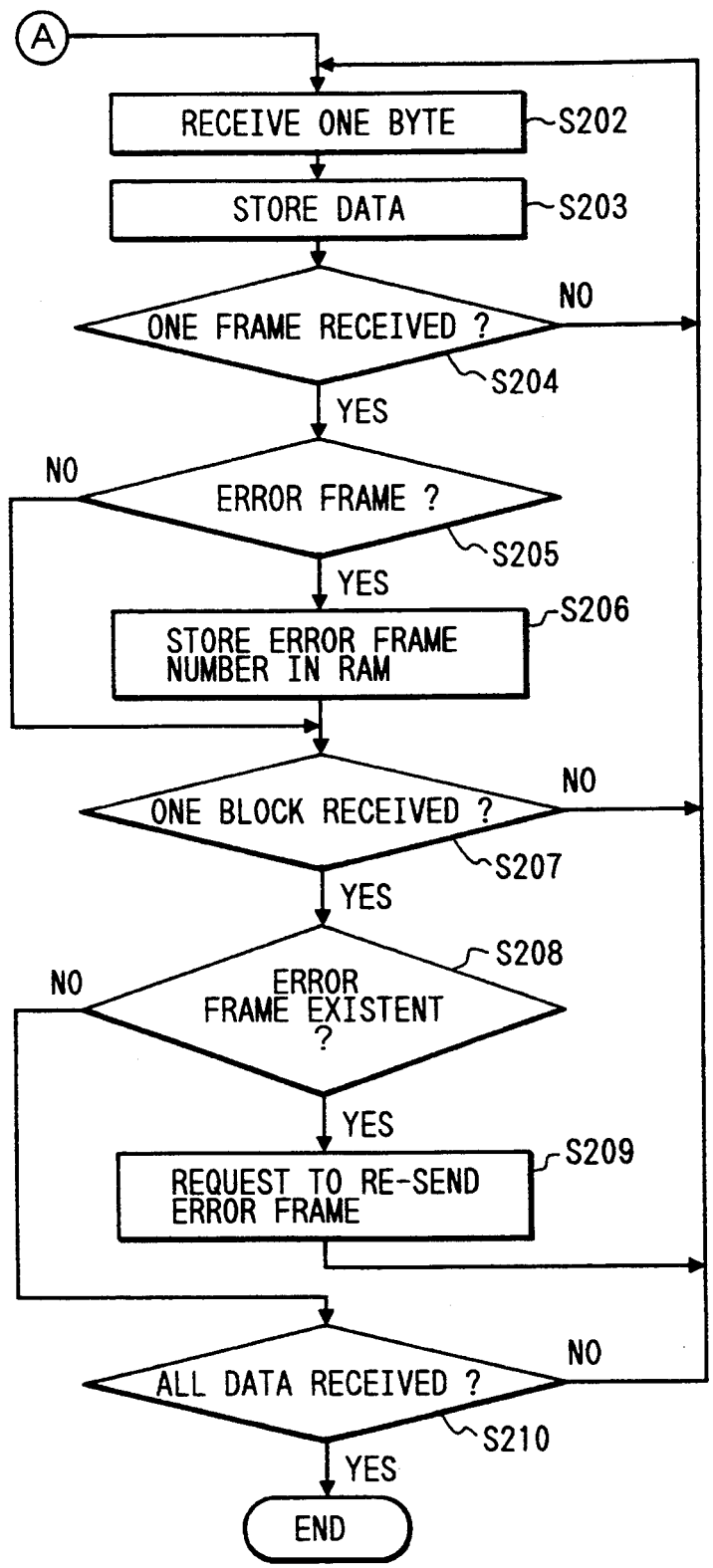

FIGS. 10 and 11 show flows executed by the CPU 8 in the ECM reception mode. When the flow advances to step S19 in the flow chart shown in FIG. 6, an ECM record routine shown in FIG. 10 is started. In the ECM record routine shown in FIG. 10, an ECM interrupt routine shown in FIG. 11 is executed in response to an interrupt request (modem interrupt) from the modem 4. Therefore, the ECM reception operation is performed by the ECM record routine shown in FIG. 10 and the ECM interrupt routine shown in FIG. 11.

In step S100 in FIG. 10, information in an area of the RAM 10 for storing a completed frame number (a frame number without an error) is read out, and it is checked whether or not there is a frame to be recorded (whether or not data in a corresponding frame are set). If there is a frame to be recorded, the data in the frame are read out from the image memory 11, and the frame number is incremented in step S101. After the processing in steps S102 to S107 is executed, it is checked in step S100 again if frame data corresponding to the incremented number are set.

If data for one frame are read out from the image memory 11 in step S101, the readout frame data are decoded by processing in units of bytes in step S102. In step S103, it is checked if decoded data (raw data) for one line are set. If the raw data for one line are not set, it is checked in step S108 if data to be decoded still remain. If the data to be decoded still remain, the flow returns to step S102 to decode data; otherwise, the flow returns to step S100, and the control waits until the next frame data are set.

With the above-mentioned processing, when the raw data for one line are set, it is checked in step S104 if the recorder 13 is busy. If the recorder 13 is not busy, the raw data for one line are transferred to the recorder 13 in step S105. Thus, data for one line are recorded. It is checked in step S106 if the recording operation of image data for one page is completed. If the recording operation of image data for one page is not completed, the flow advances to step S108; otherwise, the flow advances to step S107 to check if there is the next page (if the recording operation of all the pages is completed). If there is the next page, the flow returns to step S100.

The ECM interrupt routine shown in FIG. 11 is executed in response to the modem interrupt from the modem 4 during execution of the ECM record routine shown in FIG. 10. When received image data for one byte are set, the modem 4 generates the modem interrupt to transfer one-byte data to the CPU 8. Steps to be executed by one modem interrupt are up to the node returning to step S211 or the end of the routine. For example, when the execution is started from step S211, the routine is executed until the flow returns to step S211 again.

It is checked in step S201 if the available capacity of the image memory 11 is equal to or larger than 64 kbytes. If the available capacity of the image memory 11 is equal to or larger than 64 kbytes, image data are received and recorded in the normal ECM in step S202 and subsequent steps. When one-byte data are received from the modem 4 in step S202, the received data are stored in an ECM buffer area (a 64-kbyte area is prepared) of the image memory 11 in step S203. If it is determined in step S204 that reception of one frame is completed, a frame error is checked in step S205. If the frame error is detected, the frame number of the error frame is stored in an error frame number area of the RAM 10 in step S206, and it is checked in step S207 if reception of one block is completed. When data for one block are received, it is checked in step S208 if the error frame number is written in the error frame number area of the RAM 10 (if there is an error frame). If there is an error frame, data corresponding to a frame number to be requested to re-sent is set in step S209. After the control exits this interrupt routine, the re-send request of the error frame is issued to a transmission station in a re-send request procedure (not shown), thereby receiving error frame data again. In steps S224, S225, and S228, data corresponding to a frame number to be re-sent is similarly set to issue a re-send request after the control exits the interrupt routine. In this manner, if data for one block include no error, it is checked in step S210 if reception of all the data is completed. If the reception of all the data is completed, the reception operation is ended.

If it is determined in step S201 that the remaining capacity of the image memory 11 is smaller than 64 kbytes, one-byte data are received from the modem 4 in step S211, and it is checked in step S212 if an overflow flag is set in the RAM 10. If no overflow flag is set, the data are stored in the ECM buffer area of the image memory 11 in step S213. It is checked in step S214 if the image memory 11 is full (no remaining capacity). If the memory 11 is full, the overflow flag is set in the RAM 10 in step S215, and the frame number information obtained when the memory overflows is stored in the RAM 10 in step S216. In this manner, upon completion of reception of one frame in step S217, it is checked in step S218 if the received frame data correspond to an error frame. If the received frame data do not correspond to an error frame, a completed frame number described in step S100 in FIG. 10 is stored in the RAM 10 in step S219; otherwise, an error frame number is stored in the RAM 10 in step S220. It is checked in step S221 if reception of one-block data is completed. If the reception of one-block data is not completed, the flow returns to step S211; otherwise, the flow advances to step S222. It is checked in step S222 if the overflow flag is set in the RAM 10. If the overflow flag is set, it is checked in step S223 if there is an error frame before the image memory 11 overflows (memory full). This checking operation is performed by checking whether or not the error frame number smaller than the frame number stored in step S216 is written in the RAM 10. If there is no error frame before the memory overflows, frame number data are set to request to re-send all the frame data after the frame, which causes the memory to overflow, in step S224, and the flow advances to step S226. On the other hand, if there is an error frame before the memory overflows, frame number data are set to request to re-send the error frame and all the frame data after the frame, which causes the memory to overflow, in step S225, and the flow advances to step S226. In step S226, the overflow flag and the frame number data of the frame which causes overflow in the RAM 10 are cleared, and the error frame data in the image memory 11 are cleared. The flow then returns to step S211. In step S225, the error frame and all the frames after the frame, which causes overflow, are requested to be re-sent. However, in order to simplify the control of the CPU 8, all the frames after the error frame may be requested to be re-sent.

If it is determined in step S222 that no overflow flag is set, it is checked in step S227 if there is an error frame. If there is an error frame, frame number data is set to request to re-send error frame data in step S228, and the error frame data in the image memory 11 are cleared in step S229. The flaw then returns to step S211. If it is determined in step S227 that there is no error frame, it is checked in step S230 if reception of all the data is completed. If the reception of all the data is not completed, the flow returns to step S211; otherwise, the reception operation is ended.

The recording operation of reception data by the ECM record routine, and the storage operation of reception data to the image memory 11 by the ECM interrupt routine are asynchronously performed. Data are sequentially read out from the image memory, and are recorded by the recorder 13 until an error frame is generated. When the error frame is generated, the recording processing is interrupted in step S100 in FIG. 10. When the re-sent error frame is normally received, the recording processing is executed again. In this embodiment, even when the available capacity of the image memory 11 is equal to or smaller than 64 kbytes, the ECM reception operation can be performed (i.e., the ECM reception operation can be performed using a capacity equal to or smaller than 64 kbytes to be transmitted in the ECM). In the above-mentioned embodiment, the ECM reception operation can be performed even when the available capacity of the image memory 11 falls within a range between 16 kbytes to 64 kbytes.

[Second Embodiment]

Figure 12:
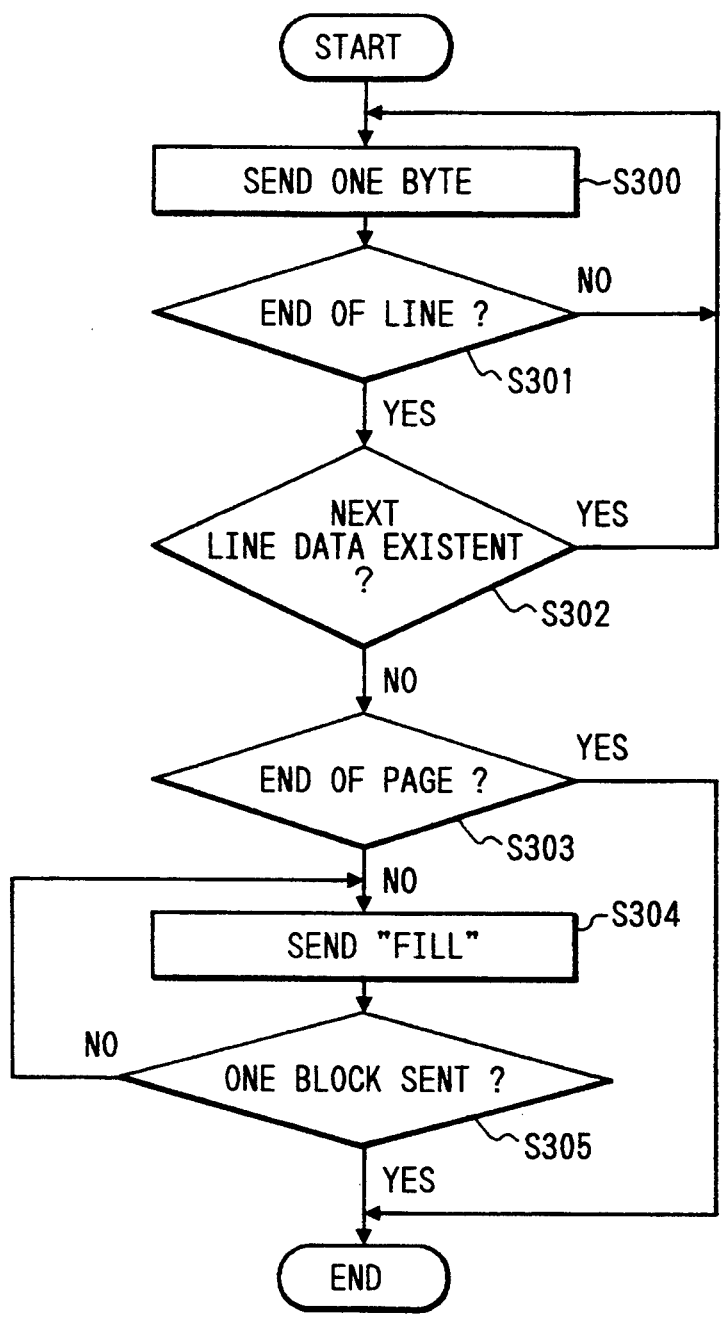
FIG. 12 is a flow chart showing another image data communication.

FIG. 12 shows a transmission sequence of one partial page according to the second embodiment. In step S300, a control unit reads out the content of an image memory by one byte, and transfers the readout content to a transmission unit. The control unit checks the end of line in step S301. More specifically, it is checked if data to be sent next is EOL data. In step S302, it is checked if data for one line to be sent next are set. In step S303, the end of page or a memory full state is checked. That is, when data for the next line are not set, and the end of page is not detected in steps S302 and S303, the memory full state is determined. In steps S304 and S305, "Fill" data are transmitted up to the end of one block when the memory full state is determined. When the memory full state is not determined, and the end of one original page is detected, the transmission operation of a partial page (block) is also ended.

[Third Embodiment]

The first embodiment exemplifies the mode wherein one frame consists of 256 bytes. However, the same control operation can be performed even in a mode wherein one frame consists of 64 bytes. When the available memory capacity is equal to or larger than 16 kbytes (=one block in the one-frame/64-byte mode), the transmission operation may be performed in the one-frame/256-byte mode; when the available memory capacity is smaller than 16 kbytes, the transmission operation may be performed in the one-frame/64-byte mode.

As described above, if image data for one partial page cannot be stored in the image data memory, the reading operation is suspended, "Fill" data are filled in the remaining portion of the block, and the block is transmitted as a Null block. Thus, even when a predetermined memory capacity does not remain, the ECM transmission operation can be performed, and the memory can be efficiently utilized.

In each of the above-mentioned embodiments, the ECM transmission operation can be performed even when the ECM area of the image memory 11 has a small capacity. However, in practice, since the number of "Fill" data to be wastefully transmitted is increased, when the free capacity for the ECM area of the image memory 11 is smaller than a predetermined value (e.g., 16 kbytes), the ECM transmission operation may be inhibited.

Some preferred embodiments of the present invention have been described. However, the present invention is not limited to the arrangements of these embodiments, and various changes and modifications may be made within the scope of appended claims.

What is claimed is:

1. A data communication apparatus having an error correction communication mode, comprising:
   a memory for storing data to be transmitted in the error correction communication mode; and
   means for, when said memory has an available capacity less than a data amount required in the error correction communication mode, transmitting dummy data in addition to transmission data stored in said memory so as to assure that an amount of data transmitted in the error correction communication mode is no less than the required data amount, the transmitted data amount being not less than the available capacity of said memory.

2. An apparatus according to claim 1, wherein said memory is utilized in a memory communication mode other than the error correction communication mode.

3. An apparatus according to claim 1, further comprising reading means for reading an original document, wherein the data read by said reading means is stored in said memory as transmission data, and wherein an operation of storing the transmission data to said memory and an operation of transmitting transmission data stored in said memory are synchronously performed.

4. An apparatus according to claim 1, wherein when a re-send request is input, whether or not data requested to be re-sent are dummy data is detected, and data are re-sent on the basis of the detection result.

5. An apparatus according to claim 4, wherein when it is determined based on the detection result that data including image data are requested to be re-sent, image data are re-sent from said memory, and when it is determined based on the detection result that the dummy data are requested to be re-sent, dummy data are re-sent by a requested data amount.

6. A data communication apparatus having an error correction communication mode, comprising:
   a memory for storing data; and
   control means for discriminating a free capacity of said memory before a data communication, and controlling a communication sequence of an error correction communication according to the discrimination result,
   wherein said apparatus has at least first and second error correction communication modes, and said control means selects one of the first and second error correction communication modes according to the discrimination result of the free capacity of said memory,
   the first error correction communication mode is a mode for, when said memory has a free capacity corresponding to a predetermined data amount to be transmitted in the error correction communication mode, performing a normal error correction communication, and
   the second error correction communication mode is a mode for, when said memory does not have the free capacity corresponding to the predetermined data amount to be transmitted in the error correction communication mode, transmitting dummy data in addition to data stored in said memory.

7. An apparatus according to claim 6, wherein when a re-send request is input, said control means detects whether or not data requested to be re-sent are dummy data, and controls a re-send operation of data on the basis of the detection result.

8. An apparatus according to claim 7, wherein when it is determined based on the detection result that data including image data are requested to be re-sent, image data are re-sent from said memory, and when it is determined based on the detection result that the dummy data are requested to be re-sent, dummy data are re-sent by a requested data amount.

9. An apparatus according to claim 6, wherein said memory is utilized in a memory communication mode other than the error correction communication mode.

10. A data communication apparatus having an error correction communication mode in a half-duplex communication, comprising:
    a data storage memory used in the error correction communication mode; and
    control means for discriminating a free capacity of said memory before a data communication in the error correction communication mode, and controlling a communication sequence of an error correction communication according to the discrimination result,
    wherein said apparatus has at least first and second error correction communication modes, and said control means selects one of the first and second error correction communication modes according to the discrimination result of the free capacity of said memory,
    the first error correction communication mode is a mode for, when said memory has a free capacity corresponding to a predetermined data amount to be transmitted in the error correction communication mode, performing a normal error correction communication, and
    the second error correction communication mode is a mode for, when said memory does not have the free capacity corresponding to the predetermined data amount to be transmitted in the error correction communication mode, transmitting dummy data in addition to data stored in said memory.

11. An apparatus according to claim 10, wherein when a re-send request is input, said control means detects whether or not data requested to be re-sent are dummy data, and controls a re-send operation of data on the basis of the detection result.

12. An apparatus according to claim 11, wherein when it is determined based on the detection result that data including image data are requested to be re-sent, image data are re-sent from said memory, and when it is determined based on the detection result that the dummy data are requested to be re-sent, dummy data are re-sent by a requested data amount.

13. An apparatus according to claim 10, wherein said memory is used in a memory communication mode other than the error correction communication mode.

14. An error correction communication method of data in a half-duplex communication, comprising the steps of:
    discriminating a free capacity of a data storage memory used in an error correction communication before a data communication in the error correction communication mode; and
    controlling a communication sequence of an error correction communication according to the discrimination result,
    wherein said method has at least first and second error correction communication modes, and one of the first and second error correction communication modes is selected according to the discrimination result of the free capacity of said memory,
    the first error correction communication mode is a mode for, when said memory has a free capacity corresponding to a predetermined data amount to be transmitted in the error correction communication mode, performing a normal error correction communication, and
    the second error correction communication mode is a mode for, when said memory does not have the free capacity corresponding to the predetermined data amount to be transmitted in the error correction communication mode, transmitting dummy data in addition to data stored in said memory.

15. A method according to claim 14, wherein when an error re-send request is input, it is discriminated whether or data requested to be re-sent are dummy bits, and when it is determined that the data requested to be re-sent are dummy bits, dummy bits are re-sent; otherwise, image data are re-sent.

16. A data communication apparatus for performing an error correction communication of data in units of blocks each having a predetermined data amount, comprising:
    a data storage memory used in an error correction communication mode; and
    control means for discriminating, before a data communication in the error correction communication mode, whether or not a free capacity of said memory is not less than a data amount of one block, and controlling a communication sequence of the error correction communication according to the discrimination result,
    wherein said apparatus has at least first and second error correction communication modes, and said control means selects one of the first and second error correction communication modes according to the discrimination result of the free capacity of said memory,
    the first error correction communication mode is a mode for, when said memory has a free capacity not less than the data amount of one block, performing a normal error correction communication, and
    the second error correction communication mode is a mode for, when said memory does not have the free capacity not less than the data amount of one block, transmitting dummy bits in addition to data stored in said memory.

17. An apparatus according to claim 16, wherein when a re-send request is input, said control means detects whether or not data requested to be re-sent are dummy data, and controls a re-send operation of data on the basis of the detection result.

18. An apparatus according to claim 17, wherein when it is determined based on the detection result that data including image data are requested to be re-sent, image data are re-sent from said memory, and when it is determined based on the detection result that the dummy data are requested to be re-sent, dummy data are re-sent by a requested data amount.

19. An apparatus according to claim 16, wherein said memory is utilized in a memory communication mode other than the error correction communication mode.

20. A data communication method having an error correction mode, comprising the steps of:
    storing data to be transmitted in an error correction communication mode in a memory having an available capacity less than a data amount required in the error correction mode; and
    assuring a data amount of data to be transmitted in the error correction communication mode by transmitting dummy data in addition to transmission data stored in said memory, said data amount being not less than the available capacity of said memory.

21. A method according to claim 20, wherein when a re-send request is input, whether or not data requested to be re-sent are dummy data is detected, and data are re-sent on the basis of the detection result.

22. A method according to claim 21, wherein when it is determined based on the detection result that data including image data are requested to be re-sent, image data are re-sent from said memory, and when it is determined based on the detection result that the dummy data are requested to be re-sent, dummy data are re-sent by a requested data amount.

23. A method according to claim 20, wherein said memory is utilized in a memory communication mode other than the error correction communication mode.

24. A method according to claim 20, further comprising the step of reading an original document to provide read data, wherein the data read in said reading step is stored in said memory as transmission data, and wherein an operation of storing the transmission data in said memory and an operation of transmitting transmission data stored in said memory are synchronously performed.

25. A method for effecting an error correction communication of data for each of a plurality of blocks having a predetermined data amount, comprising the steps of:
    discriminating whether or not a free capacity of a memory used in an error correction communication exceeds the data amount of one block before data communication by the error correction communication; and
    controlling a communication sequence of the error correction communication in accordance with a discrimination result in said discrimination step,
    wherein there are provided at least a first error correction communication mode and a second error correction communication mode, and in said controlling step, either said first error correction communication mode or said second error correction communication mode is selected in accordance with the discrimination result in said discrimination step, and
    wherein in said first error correction mode, a normal error correction communication is executed when said memory has a free capacity equal to or greater than the data amount of said one block, and in said second error correction communication mode dummy data is transmitted in addition to data stored in said memory when said memory does not have a free capacity equal to or greater than the data amount of said one block.

26. A method according to claim 25, wherein when an error re-send request is input, it is discriminated whether or data requested to be re-sent are dummy bits, and when it is determined that the data requested to be re-sent are dummy bits, dummy bits are re-sent; otherwise, image data are re-sent.

27. A method for effecting an error correction communication of data, comprising the steps of:
    discriminating a free capacity of a memory used in an error correction communication before a data communication; and
    controlling a communication sequence of the error correction communication in accordance with a discrimination result in said discrimination step,
    wherein there are provided at least a first error correction communication mode and a second error correction communication mode, and in said controlling step, either said first error correction communication mode or said second error correction communication mode is selected in accordance with the discrimination result in said discrimination step, and
    wherein in said first error correction mode, a normal error correction communication is executed when said memory has a free capacity corresponding to a predetermined data amount of data to be transmitted, and in said second error correction communication mode dummy data is transmitted in addition to data stored in said memory when said memory does not have a free capacity corresponding to the data amount of the data to be transmitted.

28. A method according to claim 27, wherein when an error re-send request is input, it is discriminated whether or data requested to be re-sent are dummy bits, and when it is determined that the data requested to be re-sent are dummy bits, dummy bits are re-sent; otherwise, image data are re-sent.

29. A data communication apparatus having an error correction communication mode, comprising:
   a memory for storing data; and
   control means for discriminating a free capacity of said memory before a data communication, and controlling a communication sequence of an error correction communication according to the discrimination result,
   wherein said control means transmits dummy data in addition to data stored in said memory, when said memory has a free capacity less than a predetermined data amount of data to be transmitted in the error correction communication mode and a data amount of data to be transmitted to a partner station is not less than the free capacity.

30. An apparatus according to claim 29, wherein when a re-send request is input, said control means detects whether or not data requested to be re-sent are dummy data, and controls a re-send operation of data on the basis of the detection result.

31. An apparatus according to claim 30, wherein when it is determined based on the detection result that data including image data are requested to be re-sent, image data are re-sent from said memory, and when it is determined based on the detection result that the dummy data are requested to be re-sent, dummy data are re-sent by a requested data amount.

32. An apparatus according to claim 29, wherein said memory is utilized in a memory communication mode other than the error correction communication mode.

33. A data communication apparatus having an error correction communication mode in a half-duplex communication, comprising:
   a data storage memory used in the error correction communication mode; and
   control means for discriminating a free capacity of said memory before a data communication in the error correction communication mode, and for controlling a communication sequence of an error correction communication according to the discriminating result,
   wherein said control means transmits dummy data in addition to data stored in said memory, when said memory has a free capacity less than a predetermined data amount of data to be transmitted in the error correction communication mode and a data amount of data to be transmitted to a partner station is not less than the free capacity.

34. An apparatus according to claim 33, wherein when a re-send request is input, said control means detects whether or not data requested to be re-sent are dummy data, and controls a re-send operation of data on the basis of the detection result.

35. An apparatus according to claim 34, wherein when said control means determines based on the detection result that data including image data are requested to be re-sent, said control means re-sends image data from said memory, and when said control means determines based on the detection result that the dummy data are requested to be re-sent, said control means re-sends dummy data in a requested data amount.

36. An apparatus according to claim 33, wherein said memory is utilized in a memory communication mode other than the error correction communication mode.

37. A data communication apparatus for performing an error correction communication of data in units of blocks each having a predetermined data amount, comprising:
   a data storage memory used in an error correction communication mode; and
   control means for discriminating, before a data communication in the error correction communication mode, whether or not a free capacity of said memory is not less than a data amount of one block, and controlling a communication sequence of the error correction communication according to the discrimination result,
   wherein said control means transmits dummy data in addition to data stored in said memory, when said memory has a free capacity less than the data amount of one block, and a data amount of data to be transmitted to a partner station is not less than the free capacity.

38. An apparatus according to claim 37, wherein when a re-send request is input, said control means detects whether or not data requested to be re-sent are dummy data, and controls a re-send operation of data on the basis of the detection result.

39. An apparatus according to claim 38, wherein when said control means determines based on the detection result that data including image data are requested to be re-sent, said control means re-sends image data from said memory, and when said control means determines based on the detection result that the dummy data are requested to be re-sent, said control means re-sends dummy data in a requested data amount.

40. An apparatus according to claim 37, wherein said memory is utilized in a memory communication mode other than the error correction communication mode.

41. A method for effecting an error correction communication of data, comprising the steps of:
   discriminating a free capacity of a memory used in an error correction communication before a data communication; and
   transmitting dummy data in addition to data stored in the memory when the memory has a free capacity less than a predetermined data amount of data to be transmitted in an error correction communication mode and a data amount of data to be transmitted to a partner station is not less than the free capacity.

42. A method according to claim 41, wherein when an error re-send request is input, it is discriminated whether or data requested to be re-sent are dummy bits, and when it is determined that the data requested to be re-sent are dummy bits, dummy bits are re-sent, and if not, image data are re-sent.

43. An error correction communication method of data in a half-duplex communication, comprising the steps of:
   discriminating a free capacity of a data storage memory used in an error correction communication before a data communication in the error correction communication mode; and transmitting dummy data in addition to data stored in said memory, when said memory has a free capacity less than a predetermined data amount of data to be transmitted in the error correction communication mode and a data amount of data to be transmitted to a partner station is not less than the free capacity.

44. A method according to claim 43, wherein when an error re-send request is input, it is discriminated whether or data requested to be re-sent are dummy bits, and when it is determined that the data requested to be re-sent are dummy bits, dummy bits are re-sent, and if not, image data are re-sent.

45. A method for effecting an error correction communication of data for each block having a predetermined data amount, comprising the steps of:

discriminating whether or not a free capacity of a memory used in an error correction communication before a data communication by the error correction communication; and transmitting dummy data in addition to data stored in the memory, when said memory has a free capacity less than the data amount of one said block and a data amount of data to be transmitted to a partner station is not less than the free capacity.

46. A method according to claim 45, wherein when an error re-send request is input, it is discriminated whether or data requested to be re-sent are dummy bits, and when it is determined that the data requested to be re-sent are dummy bits, dummy bits are re-sent, and if not, image data are re-sent.

* * * * *